US010809145B2

(12) United States Patent
Nosko

(10) Patent No.: US 10,809,145 B2
(45) Date of Patent: Oct. 20, 2020

(54) SENSOR AND SYSTEM FOR MONITORING INTEGRITY OF A WATERPROOFING SYSTEM OR MEMBRANE

(71) Applicants: SENSOR SPOL. S.R.O, Pezinok (SK); SENSOR (UK) LTD, Manchester (GB)

(72) Inventor: Vladimir Nosko, Pezinok (SK)

(73) Assignees: SENSOR SPOL. S.R.O, Pezinok (SK); SENSOR (UK) LTD, Manchester (GB)

( * ) Notice: Subject to any disclaimer, the term of this patent is extended or adjusted under 35 U.S.C. 154(b) by 107 days.

(21) Appl. No.: 15/323,002

(22) PCT Filed: Jun. 29, 2015

(86) PCT No.: PCT/GB2015/051892
§ 371 (c)(1),
(2) Date: Dec. 29, 2016

(87) PCT Pub. No.: WO2016/001639
PCT Pub. Date: Jan. 7, 2016

(65) Prior Publication Data
US 2017/0138812 A1 May 18, 2017

(30) Foreign Application Priority Data

Jul. 1, 2014 (GB) .................................. 1411696.6

(51) Int. Cl.
G01R 31/00 (2006.01)
G01M 3/16 (2006.01)
E04D 13/00 (2006.01)
E04D 5/00 (2006.01)
E04D 7/00 (2006.01)
(52) U.S. Cl.
CPC ............. G01M 3/16 (2013.01); E04D 13/006 (2013.01); E04D 5/00 (2013.01); E04D 7/00 (2013.01)

(58) Field of Classification Search
USPC ........................ 324/534, 532, 658, 694, 71.1
See application file for complete search history.

(56) References Cited

U.S. PATENT DOCUMENTS

2002/0028110 A1 3/2002 Rhee et al.
2011/0178747 A1* 7/2011 Gunness ................ G01M 3/16
702/65
2015/0168329 A1* 6/2015 Gunness ................ G01M 3/40
324/663

FOREIGN PATENT DOCUMENTS

EP 0278503 8/1988
EP 0962754 12/1999
JP H11271166 A 10/1999
JP 2001050851 A 2/2001
JP 2004157041 6/2004
WO 8806929 9/1988

OTHER PUBLICATIONS

International Search Report and Written Opinion for Application No. PCT/GB2015/051892 dated Oct. 14, 2015 (3 pages).

* cited by examiner

Primary Examiner — Vincent Q Nguyen
(74) Attorney, Agent, or Firm — Michael Best & Friedrich LLP

(57) ABSTRACT

A sensor and system for monitoring integrity of a waterproofing system membrane. A geomembrane integrity monitoring system includes control means 18 and a plurality of sensors 20. The sensors 20 are electrically isolated from each other and in electrical communication to the control means 18. The sensors 20 have a sheet form.

8 Claims, 2 Drawing Sheets

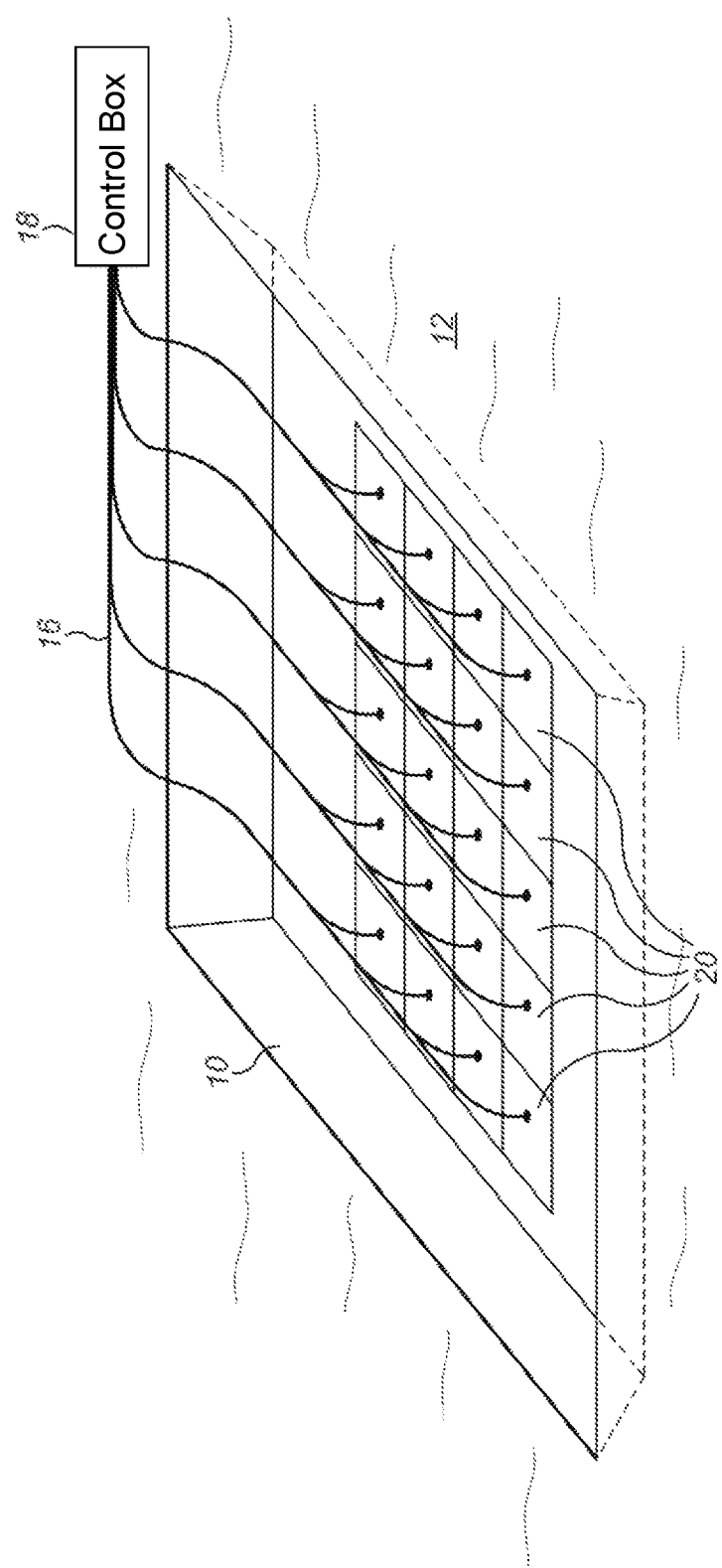

SENSOR AND SYSTEM FOR MONITORING INTEGRITY OF A WATERPROOFING SYSTEM OR MEMBRANE

Figure 1:
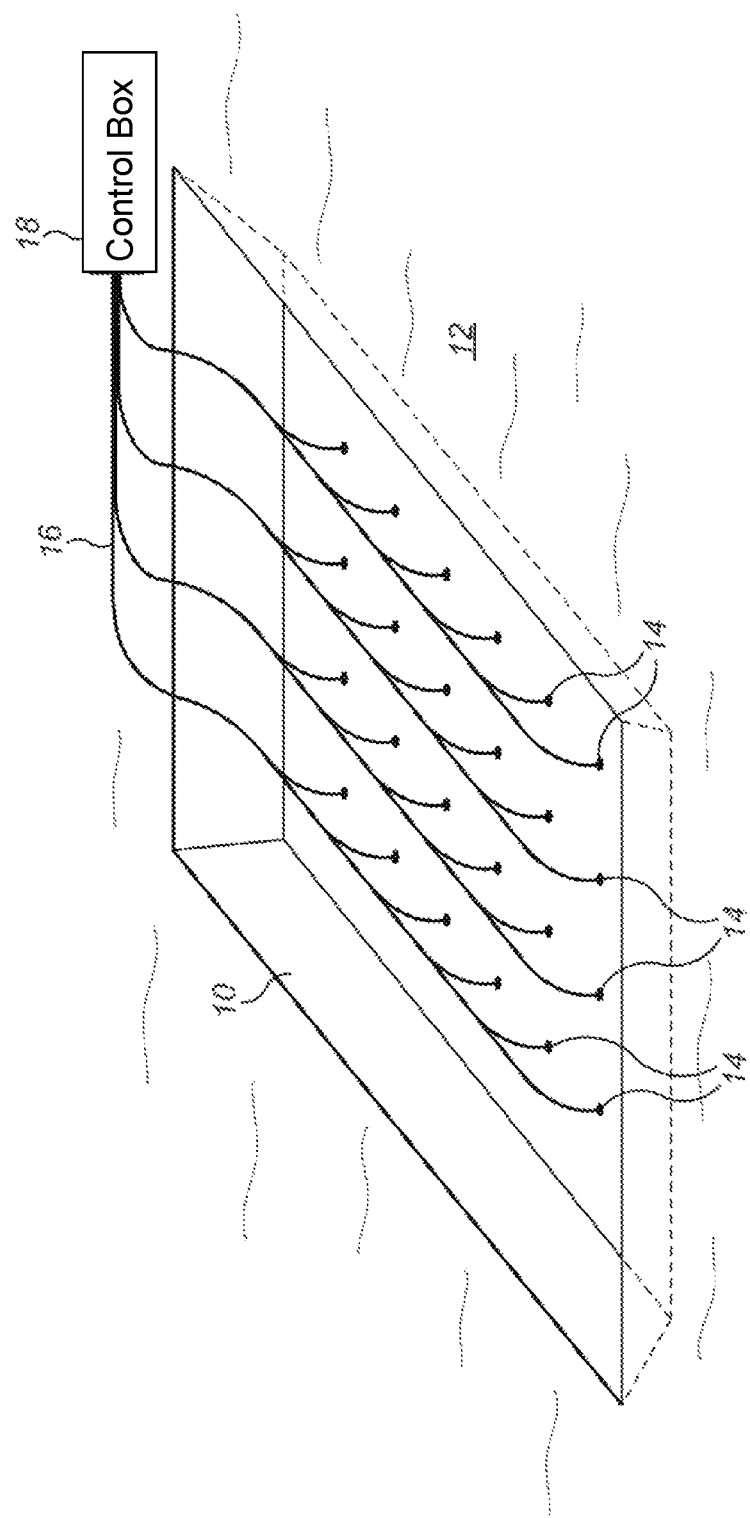

This invention relates to a system and sensor for monitoring integrity of waterproofing membranes and to a method of monitoring integrity of waterproofing membranes, particularly, but not limited to, the monitoring of leaks in roofs and geomembranes. Any reference to geomembrane or membrane in the following shall be interpreted to include waterproofing, containment or protective system including roofing systems, whether applied in sheets, rolls, spray, liquids, or paints.

Various methods of electronic leak detection and location have been disclosed previously. Some of the methods involve the use of a highly resistive plastic geomembrane being installed with electric poles at either side of the membrane. When a fault occurs in the geomembrane an electric connection occurs, which is detected as a current flow.

In one system for electronic leak detection and location a single pole on one side of the geomembrane is used and an operator with another pole being connected to earth outside the geomembrane. The operator carries a pair of sensors and when he passes a hole in the geomembrane a polarity shift is detected, leading to the detection and location of the leak.

In a more sophisticated system, as described in EP0962754, often referred to as a fixed or permanent leak detection system, a network/grid of point sensors is installed beneath the geomembrane to allow for more accurate detection of a leak. For example, sensors may be spaced on a grid of approximately 3 m×m, which spacing can lead to a sensitivity of approximately 300 mm. Other grid spacings are possible, for example at intervals of between 3 and 10 metres. In this installation the sensors are located outside the geomembrane, leaks from which are to be detected. A further improvement of this type of system is to use two layers of membrane with the sensors and a conductive geotextile being located between the two layers of geomembrane and source electrodes being located outside the two layers of geomembrane in the earth or covering above and below the two geomembranes. The use of two membranes with sensors in between allows an alarm type of detection and location system to be provided, because the sensors are isolated from currents within the material being retained by the geomembrane and also from stray or environmental currents in the earth outside the geomembrane. Thus, when a leak does occur and the moisture leaks into the space between the two geomembranes this allows the electrical signal current to flow with the moisture into the encapsulated conductive textile between the two layers of membrane, the point sensors can detect the increase in current, allowing an alarm condition to be raised if a suitable monitoring system is installed and connected to the point sensors. Such systems exist for both online/permanent monitoring of membrane with suitable monitoring equipment being installed permanently on site and offline systems where only connectors are installed on site requiring power sources and testing equipment to be brought to site in order to test the installed point sensor system manually. In either case the systems require analysis of the data collected from the sensors either manually, or in some cases automatically by very costly hardware and software.

Disadvantages arise with the types of system described above, in particular the more sophisticated point sensor or fixed system because the system will detect a leak immediately but it can take some time to locate the position due to the complex three dimensional algorithms that must be employed in order to accurately position the damage to the membrane as well as taking into account the variety of environmental conditions that can affect the data collected from point sensors with a traditional fixed or permanent membrane monitoring system.

It is an object of the present invention to address the abovementioned disadvantages.

According to the present invention there is provided an apparatus and method as set forth in the appended claims. Other features of the invention will be apparent from the dependent claims, and the description which follows.

According to a first aspect of the present invention, there is provided a geomembrane integrity monitoring system comprising control means and a plurality of sensors, wherein the sensors are electrically isolated from each other and in electrical communication to the control means, wherein the sensors have a sheet form.

The sensors may be sheet sensors or tile sensors.

The sensors may be physically connected to each other, albeit electrically isolated from each other. The sensors may be physically joined by a non-conducting material, which may form a welded joint between sensors.

The sensors may be spaced from each other to leave a gap therebetween, which gap is electrically non-conducting.

The electrical communication with the control means may be a wired or wireless communication.

The sensors may be formed from a mesh material, which may be formed in mesh sheets, preferably having first elements of the mesh that are electrically conducting. The mesh may have second elements that may be welded, or otherwise connected, to other parts of the mesh, which second elements may be electrically non-conducting. The mesh may have third elements that are provided for structural strength. The first second and/or third elements may have one or more of the weldable, electrically conducting or strength functions referred to above.

The sensor may be formed using any conductive materials set out in a sheet or tile format as described above for example a conductive paint can be used to create conductive sheets/tiles (i.e. painted sheet sensors) for use with, but not limited to, liquid applied roofing systems.

The invention extends to a kit comprising at least one sensor and the control means of the previous aspect.

According to an aspect of the present invention there is provided a set of sensors for a geomembrane integrity monitoring system in which the set of sensors is at least in part physically continuous, with each of the sensors being electrically isolated from the others.

According to an aspect of the present invention there is provided a sensor for a geomembrane integrity monitoring system wherein the sensor comprises a sheet of electrically conducting material.

The sensor may be formed from a mesh material, which may be formed in mesh sheets, preferably having first elements of the mesh that are electrically conducting. The mesh may have second elements that may be welded, or otherwise connected, to other parts of the mesh, which second elements may be electrically non-conducting. The second elements may be connected at crossing points of sections of the mesh. The mesh may have third elements that are provided for structural strength. The first second and/or third elements may have one or more of the weldable, electrically conducting or strength functions referred to above.

According to an aspect of the present invention there is provided a geomembrane integrity monitoring system comprising a plurality of sensors and control means where one sensor is physically connected to at least one adjacent sensor, with the sensors being electrically isolated from one another, wherein all of the sensors are in electronic communication with the control means.

The sensors may be physically joined by a non-conducting material, which may form a welded joint between sensors.

According to an aspect of the present invention there is provided a conductive layer for use in a two layer geomembrane integrity monitoring system, the conductive layer comprising a mesh material. The mesh material may be formed in mesh sheets, preferably having first elements of the mesh that are electrically conducting. The mesh may have second elements that may be welded, or otherwise connected, to other parts of the mesh, which second elements may be electrically non-conducting. The second elements may be connected at crossing points of sections of the mesh. The mesh may have third elements that are provided for structural strength. The first second and/or third elements may have one or more of the weldable, electrically conducting or strength functions referred to above.

For a better understanding of the invention, and to show how embodiments of the same may be carried into effect, reference will now be made, by way of example, to the accompanying diagrammatic drawings in which:

FIG. 1 is a schematic perspective drawing showing a prior art geomembrane integrity detection system; and FIG. 2 is schematic perspective drawing showing a geomembrane integrity detection system according to an embodiment of the present invention.

FIG. 1 shows a schematic view of a geomembrane integrity detection system part way through installation according to a prior art method. A geomembrane 10 is laid in the ground 12. Multiple point sensors 14 are then laid at regular intervals, for example 3 m apart (although spacings of 3-10 metres may be used), on the membrane and wiring 16 is taken from each of the point sensors 14 to a control box 18 for monitoring of the sensors 14 during operation. After the sensors 14 and wiring 16 have been put in position a conductive textile and further geomembrane (not shown for clarity) is placed over the existing geomembrane 10, sensors 14 and wiring 16 to provide the two layer system referred to above. Outside the two layers of waterproofing membrane or geomembranes source electrodes are installed either above and/or below to provide the opposite electrical pole of the system (e.g. positive inside and negative outside the two layers of geomembrane).

It would be possible to lay the point sensors 14 and wiring 16 on the ground beneath the geomembrane 10 to provide a single layer system also as described above. However, that system has not been shown in FIG. 1 for better clarity.

FIG. 2 shows an installation similar to that of FIG. 1 but using a system and sheet sensors according to an embodiment of the present invention. For the parts of the system that are the same, the same reference numerals have been used. For example, a geomembrane 10 is shown located in the ground 12 with wiring 16 attached to sensors and to a control means 18. The sensors in FIG. 2 are of a different construction to those prior art sensors shown in FIG. 1.

The sensors in FIG. 2 are of a sheet construction, and are formed of an electrically conducting material. The sheet construction may be in the form of a mesh sheet with mesh being formed of, for example, strings formed from polyethylene with an electrically conductive element (such as carbon), which allows for an electrically conducting material. These strings could be formed into a mesh by point welding at intersections making use of the properties of the polyethylene to allow for welding together of the individual strings. One example of material for the mesh would be high density polyethylene, potentially formed by an extrusion process. Another example of sheet sensors would be the use of tiles constructed using a metallic mesh such as stainless steel or titanium. A further example would be the use of a conductive paint, adhesive or powder to form a conductive tile within the build up of a liquid applied or spray applied waterproofing system.

Each sheet sensor 20 in FIG. 2 is in the form of a tile, which is electrically isolated from other sheet sensors 20 in the same installation. The electrical isolation may be provided by a gap between adjacent sheet sensors 20, in which example individual sheet sensors 20 will be laid on the geomembrane 10 with a physical spacing between them with each sheet sensor 20 being wired by wiring 16 to the control means 18 as mentioned above. A further geomembrane is then placed on top of the geomembrane 10, sheet sensors 20 and wiring 16 to provide the two layer systems mentioned above. In this example the sheet sensors 20 will be electrically isolated from one another by means of their physical separation.

An alternative arrangement for the sheet sensors 20 is to provide a physically continuous array of sheet sensors 20 which are electrically isolated from one another by means of being welded together using an extrusion weld method, with the extrusion weld being formed by a non-conductive material which provides the only contact between adjacent sheet sensors 20 and thereby electrically isolates the sheet sensors 20 from each other. As mentioned above, once the sheet sensors 20 are installed the further geomembrane is placed on top of the geomembrane 10, sheet sensors 20 and wiring 16 and the further membrane can be filled with the material to be retained by the geomembranes 10, or put into service as a roof.

Once physically installed in this way with the sheet sensors 20 connected by the wiring 16 to the control means 18 the integrity of the geomembrane placed on top of the sheet sensors can be monitored, as is the geomembrane 10 below the sheet sensors. If any moisture enters the space between the two geomembranes then its presence will cause current to be detected by the sheet sensor 20 that is contacted by the moisture. Of course, multiple sheet sensors 20 may be contacted by the moisture, in which case all of the contacted sheet sensors 20 will enable the connected monitoring system to trigger an alarm and identify the position of the leak simultaneously, whereas with the prior art system using point sensors there is a delay between detecting the leak and accurately locating its position.

The sheet sensors 20 described herein and the system described herein provides significant advantages over the prior art point sensor systems. In particular, with a prior art point sensor system the triggering of point sensors 14 does not automatically provide a location for a breach in one of the geomembranes. Instead, triggering of the point sensor 14 will only indicate that leachate has contacted the installed point sensors 14, with the source of that leachate leak being unknown without significant manual analysis or the development of complex point sensor analysis software. This disadvantage is solved by the sheet sensors described herein, because breach of either of the geomembranes 10 will result in triggering of a sheet sensor adjacent to the breach which identifies a specified area of the geomembrane which has been breached, being that corresponding to the area of the sheet sensor 20 that has been triggered. Thus, a plurality of defined zones is separately monitored, with each zone being defined by one of the sheet sensors 20.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A geomembrane integrity monitoring system comprises control means, two geomembranes and a plurality of sensors installed between the geomembranes,
    wherein the sensors are electrically isolated from each other and in electrical communication to the control means;
    wherein the sensors have a sheet form, each sensor having an area;
    wherein the control means is adapted to identify a specified zone of the geomembranes which has been breached by detecting a triggering of a single one of the sensors adjacent to the breach, wherein the zone corresponds to the area of the triggered sensor;
    wherein the control means is adapted to detect the triggering of the single one of the sensors by detecting the presence of an electrical current that flows between the single one of the sensors and ground and that is caused by moisture entering the space between the two geomembranes and contacting the single one of the sensors; and
    wherein the sensors are formed from a mesh material.

2. The geomembrane integrity monitoring system of claim 1, in which the sensors are sheet sensors or tile sensors.

3. The geomembrane integrity monitoring system of claim 1, in which the sensors are physically connected to each other, albeit electrically isolated from each other.

4. The geomembrane integrity monitoring system of claim 3, in which the sensors are physically joined by a non-conducting material.

5. The geomembrane integrity monitoring system of claim 1, in which the sensors are spaced from each other to leave a gap therebetween, which gap is electrically non-conducting.

6. The geomembrane integrity monitoring system of claim 5, in which the mesh material has first elements of the mesh that are electrically conducting and second elements that are welded, or otherwise connected, to other parts of the mesh, which second elements are electrically non-conducting.

7. The geomembrane integrity monitoring system of claim 5, in which the mesh has third elements that are provided for structural strength.

8. A kit comprising at least one sensor and the control means of claim 1.

* * * * *